United States Patent
Dettmann et al.

(10) Patent No.: US 6,545,463 B1
(45) Date of Patent: Apr. 8, 2003

(54) LENGTH MEASUREMENT SYSTEM WITH AT LEAST ONE MAGNETIC MEASURING ROD

(75) Inventors: Fritz Dettmann, Wetzlar (DE); Uwe Loreit, Wetzlar (DE); Heike Bischoff, Coburg (DE); Hilmar Dohles, Itsgrund (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/936,886
(22) PCT Filed: Mar. 10, 2000
(86) PCT No.: PCT/DE00/00788
§ 371 (c)(1), (2), (4) Date: Sep. 10, 2001
(87) PCT Pub. No.: WO00/54010
PCT Pub. Date: Sep. 14, 2000

(30) Foreign Application Priority Data

Mar. 10, 1999 (DE) .......................... 199 10 636

(51) Int. Cl.$^7$ ............................ G01B 7/14; G01B 7/30; G01R 33/06
(52) U.S. Cl. ........................ 324/207.21; 324/207.24; 338/32 R
(58) Field of Search ................ 324/207.21, 207.22, 324/207.24, 207.2, 117 R, 252, 173, 174; 338/32 R, 32 H; 74/473.12, 335; 341/15

(56) References Cited

U.S. PATENT DOCUMENTS

| | | | |
|---|---|---|---|
| 4,401,944 A | * 8/1983 | Narimastu | 324/207.21 |
| 4,757,257 A | * 7/1988 | Washism | 324/207.24 |
| 6,011,390 A | 1/2000 | Loreit et al. | 324/207.21 |
| 6,441,567 B1 | * 7/2002 | Skogward | 74/473.12 |

FOREIGN PATENT DOCUMENTS

| | | |
|---|---|---|
| DE | 31 06 613 | 12/1981 |
| DE | 195 21 617 | 3/1997 |
| DE | 197 29 312 | 1/1999 |
| EP | 0 482 341 | 4/1992 |

OTHER PUBLICATIONS

"Manches Ist Nun Machbar", Elektrotechnik, De, Vogel Verlag K.G. Wurzburg, vol. 73, No. 4, Apr. 1991, pp 76,78–79, XP000227652.

A. Petersen, "The magnetoresistive sensor," "a sensitive device for detecting magnetic–field variations", Electronic Components and Applications, vol. 8, No. 4, 1988, pp 222–239.

English translation of International Preliminary Examination Report for corresponding PCT/DE00/00788.

* cited by examiner

Primary Examiner—Edward Lefkowitz
Assistant Examiner—Subhash Zaveri
(74) Attorney, Agent, or Firm—Christie, Parker & Hale, LLP

(57) ABSTRACT

In at least one measuring rod of the length measurement system the direction of magnetization lies in the plane of its cross-section which is perpendicular to the direction of measurement and forms a magnetization pattern. In the simplest case the magnetization of the cross-section is homogeneous. As one advances in the direction of measurement the magnetization pattern is increasingly rotated in relation to the starting end of the measuring rod. This magnetization results in a magnetic field whose direction is also continuously rotated as one advances in the direction of measurement. By means of at least one magnetic field sensor which responds to the direction of the magnetic field the prevailing field angle for each position is determined and can be clearly assigned to the position for a multitude of different variants of the length measurement system.

53 Claims, 10 Drawing Sheets

LENGTH MEASUREMENT SYSTEM WITH AT LEAST ONE MAGNETIC MEASURING ROD

CROSS-REFERENCE TO RELATED APPLICATION

This application claims priority of International application number PCT/DE00/00788, filed Mar. 10, 2000, which in turn claims priority to German patent application number 199 10 636.3, filed Mar. 10, 1999.

FIELD OF INVENTION

The invention relates to a length measurement system including one or more magnetic measuring rods and one or more magnetic field sensors.

The invention relates in particular to a magnetic length measurement system, such as is used for example for automatically determining positions, lengths and distances more particularly under rough surrounding conditions in machine engineering or in the automobile industry.

BACKGROUND OF THE INVENTION

Known magnetic length measurement systems include a magnet arrangement and one or more magnetic field sensors which indicate a component of the magnetic field strength or the magnetic field direction. In the simplest case the magnet arrangement is formed by a simple rod magnet and a magnetic field sensor is formed by a magnetoresistive sensor whose output voltage is determined by the field direction. This is described in the article "The magnetoresistive sensor" by A. Petersen in Electronic Components and Application 8 (1988) NO 4, 222–239. The sensor is guided at a certain distance from the magnet parallel to its north-south extension which is also the direction of measurement. The sensor plane extends in the direction of measurement and radially relative to the axis of the magnet.

A rod magnet with magnetization set in the longitudinal direction and whose length is not significantly greater than twice the width and thickness produces a magnetic field whose angle to the parallel of the longitudinal direction increases roughly linearly in the direction of measurement with increasing distance from the magnet centre. The magnetization in the magnetoresistive sensor lies in the plane of stratification and is set with a sufficiently high field strength in the direction of the field. The output signal of the magnetoresistive sensor then changes proportional to the sine of the double angle. Since the sin(x) for small angles deviates only slightly from x a length range is produced in which the output voltage of the sensor is proportional to the position. In terms of accuracy this simplest arrangement has several drawbacks which are partly a result of the magnetic field distribution of the rod magnet and partly as a result of the properties of the magnetoresistive sensor.

The damaging marked temperature dependence of the output signal on magnetoresistive sensors and the restriction to small angular deviations from the parallel to the north-south direction of the magnet and thus to measuring lengths which are substantially smaller than the magnetic length has already been overcome by the arrangement indicated in patent DE 195 21 617. Here two magnetoresistive sensor bridges integrated onto one chip are used which supply both an output signal proportional to the sine and an output signal proportional to the co-sine of the double angle of the field direction. Through the formation of quotients the temperature-dependent amplitude no longer applies, and from the arcuate rod thus obtained it is possible to determine the angle without approximation over the entire length of the magnet. Thus measurement errors result here still mainly from the fact that there are deviations from the linear connection between angle and position. These deviations are however quite considerable for magnets where the lengths are long compared with the width and thickness. Furthermore the field strength over the middle part of a long magnet is only very slight so that the alignment of the magnetization in the resistance strip of the magnetoresistive sensors is no longer provided.

Therefore, for measuring large stretches measuring rods are used which consist of regions of uniform length magnetized alternately in the positive and negative longitudinal direction, as also indicated in DE 195 21 617. Determining the length is then carried out by counting the number of magnetized regions already passed from a starting position and adding the proportion of one region which results from the angular determination. However, information on the absolute position is no longer possible. After a breakdown of the measurement system it is necessary to return to the starting position in order to repeat the counting process.

In order to determine the absolute position it is also possible to undertake coding of the measuring rod wherein, however, uniformly magnetized regions of different length have to be used. Use of these regions results in the drawback already mentioned above of the small field strength close to the middle part of the region when several regions with the same code value lie next to each other. This problem can however be overcome by the arrangement described in EP 0 482 341 where twin tracks are used each with opposite magnetization whose direction always stands transversely to the direction of measurement. Unfortunately however in the said patent there is no arrangement given for producing the required twin track measuring rods, and the known magnetizing processes do not provide satisfactory results for the twin track.

Magnet arrangements comprised of several parts for determining position are proposed in the published specification DE 31 06 613. They are provided in order to achieve over quite specific short path lengths high local resolutions in position calculation. The drawback with all the different arrangements given is the extremely high dependence of the output signals on the distance between the magnet and sensor, which makes it necessary to provide very expensive guides for high-resolution position measurement and incurs high costs for adjustment and calibration.

DE 197 29 312 A1 describes an absolute magnetic length measurement system which contains a code track on a measuring rod and several sensors for scanning the magnetic fields which are present over the code track. One binary state of a code element in the code track is represented through a uniform magnetization and the other binary state is represented through a change in the direction of magnetization. This code track which is defined by binary states of one code element is scanned through several magnetoresistive sensors from whose output signals it is possible to determine the positions of the sensors relative to the code track. However several sensors are always required for this In the Journal "Elektrotechnik" 370, Volume 4 of Apr. 4, 1991 there is a review on the use of different materials for manufacturing permanent magnets of different magnetization.

SUMMARY OF THE INVENTION

The invention is concerned with the problem of providing a length measurement system having a magnetic measuring rod which is characterised by a simplified structure.

According to one aspect of the invention, the length measurement system includes at least one magnetic measuring rod in which a significant component of magnetization or the magnetization as a whole lies (substantially) in a plane which extends perpendicular to the direction of measurement, and of one or more magnetic field sensors wherein the angle of the component of the magnetization or of the magnetization as a whole changes relative to a freely selectable preferred direction (reference direction) in this plane along the direction of measurement; i.e. the direction of the component of magnetization is rotated along the direction of measurement, namely about an axis which runs along the direction of measurement. To each longitudinal position of the magnetic field sensor is thereby assigned a direction of the component of the magnetization within the measuring rod at this longitudinal position from which the longitudinal position of the magnetic field sensor can be determined.

In one embodiment, the entire cross-sectional surface of the measuring rod or of the plurality of measuring rods is uniformly magnetized. It points for example at the start of the measurement path perpendicularly upwards. As one advances in the direction of measurement the magnetizing direction is inclined increasingly relative to the preferred direction (perpendicular direction). Thus a value for the angle between the field direction and the preferred direction is assigned to each position. The magnetic field strength near the measuring rod is determined by the size of the cross-section and the material of the measuring rod. It is thus not dependent on the position in the direction of measurement. Thus it is possible to use measuring rods of any length and any angular change per length in the direction of measurement and to provide always the same measuring conditions for the magnetic field sensors which are used for determining the relevant field direction.

One embodiment uses an anisotropic magnetoresistive angle sensor for determining the direction of the magnetic field. On the chip face of the sensor there is a Wheatstone bridge, whose output signal is proportional to the sine of the double angle between the field direction and one edge of the chip and a bridge whose output signal is proportional to the co-sine of the double angle. The magnetoresistive angle sensor is attached close to the measuring rod so that its chip surface is perpendicular to the direction of measurement. Since the sine and cosine of the double angle are formed, a full period of the output signal is already obtained for a rotation of the magnetization direction relative to the output angle of 180°. Thus when using a measuring rod and an angle sensor an absolute position indication is also possible only for this angular range. The length over which the measuring rod is magnetized with the angular rotation of 180° can be selected at will.

Since the angle measurement for determining the position is obviously liable to error, in the event where the measuring rod is magnetized so that the angle of the direction of magnetization increases linearly with the increasing position value, in the case of long measuring rods greater absolute length errors can also occur. Advantageously there are numerous arrangements which utilize the principle according to the invention of setting the direction of magnetization in the cross-sectional surface which is perpendicular to the direction of measurement so that the measuring length and measuring accuracy can be adapted according to each individual requirement.

In another embodiment, if the high measurement accuracy is only required over a part of the overall measurement path then the angular increase per unit of length is selected higher in this part than in the remaining measurement path. The part of the measurement path which can be determined with higher precision need therefore not be cohesive but can be divided up into several regions. In a special case the angular increase can also be undertaken stepwise with the position, in which case the regions of high measurement precision are the transitions between two steps. In another embodiment, if the higher measurement precision for the position is required over the entire length of the measuring rod then two parallel measuring rods are used. With the first the angle of the magnetization direction increases linearly with increasing position from the starting value and the rotation reaches 180° at the end of the measuring rod. The angle of the magnetization direction of the second measuring rod likewise increases linearly with the position, but with a significantly higher rise so that the associated angle sensor, which with an angular rotation of 180° indicates passing through a full period, runs through a number of periods over the entire length. The angle sensors of the first and second measuring rod are situated in a common plane perpendicular to the direction of measurement. From the indicator of the angle sensor of the first measuring rod it is possible to determine in which period of the second measuring rod the relevant sensor is situated. The indicator of the second sensor supplies the position within this period with a precision which is better by the total number of the periods of the second measuring rod than that of the angle sensor of the first measuring rod.

In a further embodiment of the invention two measuring rods are also used which are arranged in parallel. The angular rotation of the magnetization of the two measuring rods increases linearly with the position and in both cases runs through numerous periods. The number of periods over the total length differs however by one. The angle sensors of the first and second measuring rod are situated in a common plane perpendicular to the direction of measurement. From the difference in the angle indicators of the two sensors it is determined in which period of the first measuring rod the sensors are situated. The exact position is then produced by additionally taking into consideration the indicator of the sensor belonging to the first measuring rod.

In a further embodiment of the invention a very long measuring rod is divided in the direction of measurement into a number of regions of equal length. Each region contains the same number of sections of equal length. This number can be five for example. In each first section of each region the angle of the direction of magnetization rises linearly from the beginning with an increasing position value up to a certain critical angle. In the other four sections the angle of the direction of magnetization has within each section length a constant value which is however in each case greater than the said critical angle. The four discrete angular values in these four sections are assigned to numerical values. If for example four discrete angular values are different and are assigned to numbers 0, 1 , 2 and 3 then all numbers from 0 to 255 are represented in the four sections. Just as many regions can thus be characterised in the sequence of these numbers. If two angle sensors oppose each section of one region at a spacing of half the section length then it is possible to determine the special angular value in the first section and the angular values of the further four sections assigned to the numerical values in each position of the sensor arrangement relative to the measuring rod. From the determined number it is possible to indicate which region of the measuring rod is reached by the sensor arrangement. The position can be read off with high precision from the special angular value of each first section owing to the linear rise of the angle with increasing position. If the lengths of the sections are selected as 20 mm and in the first section the angle rises with the position from 0° to 40° and can be measured with a measurement error of less than one degree, then a total measurement length of 25.6 m can be measured with an accuracy of 0.5 mm restricted by the angular measurement. The resolution thereby achieved is at more than 15 bit.

The numerical values mentioned up until now are to demonstrate the advantages which are possible with the length measurement system according to the invention. They in no way represent a limit on that which can be reached. Thus it is possible throughout with the existing measurement precision for the angle, instead of assigning four numerical values to four discrete angular values also to assign ten numbers to ten discrete angular values and thus to obtain straightaway in the decimal system the indication of the number of the regions which lie between the beginning of the measuring rod and the actual position of the sensor arrangement.

Further embodiments of the invention avoid errors in the measurement of the position through faulty adjustment of the position of the angle sensors relative to the measuring rod. It is thus advantageous not only to use one angle sensor next to the measuring rod but also to attach two angle sensors on opposite sides of the measuring rod. If the sensors are situated on a line running through the centre point of the cross-section of the measuring rod and the magnetization of the cross-sectional surface is homogeneous then both sensors indicate the same error-free angle. If the connecting line does not however run through the centre point then the first sensor measures an angular value which is too big by a certain amount and the second sensor measures an angular value which is too small by the same amount. The mean value of the two measured values thus provides the exact value without the need for an expensive precision adjustment of the position of the sensors relative to the measuring rod.

In a further embodiment of the invention two magnetoresistive angle sensors are used which are arranged next to one another at a certain spacing in the direction of measurement. This certain spacing coincides with the length over which extends, at the beginning of the measuring rod, rotation of the direction of magnetization about 180° and over which the output signal of the sensors runs through a complete period. The output signals of the two sensors thus coincide at the beginning of the measuring rod. In the measuring rod which is used the increase in the angle with the position in the direction of measurement does not run linearly but quadratically. As the position grows, the sensor set in this direction runs through an increasingly larger angular range than the other sensor. Owing to the quadratic increase in the angle this angular range increases linearly with the position, and the difference in the output signals of the two sensors is proportional to the position value. The position given is absolute when the sensor at the end of the measuring rod set in the direction of the growing position has run through no more than one complete sensor period than the other sensor. The advantage of this arrangement is that the measuring rod here can be turned any where about its longitudinal axis without affecting the measuring signals.

In the embodiments of the invention mentioned up until now the measuring rod was always magnetized homogeneously over its entire cross-section. However the magnetization of the cross-section of the measuring rod can also be multi-polar so that north and south poles alternate with each other around the periphery. In one embodiment, the magnetization pattern in the cross-sectional area at the starting end of the measuring rod is then rotated with an increasing angle as one advances in the direction of measurement. The advantage of a multi-polar magnetized measuring rod of this kind is that the rotation of the magnetization pattern as the position advances results in a rotation of the magnetic field near the measuring rod duplicated by half the pole number so that a considerably enhanced increase in the angle measured by the angle sensors per unit of length of the measuring rod is achieved. A significantly increased resolution of the measured length is thus provided.

In another embodiment of the invention, only a part of the cross-section of the measuring rod is made from a hard magnetic material. A characteristic of the invention is that the direction of magnetization is rotated as one advances in the direction of measurement. With circular cross-section for example the concentric inner circular part can be made from hard magnetic material and the circular ring-shaped part surrounding same can be made from a non-magnetic mechanically stable material. The mechanically stable material prevents mechanical torsion of the measuring rod about its longitudinal axis and thus helps to reduce measurement errors. The distribution of the materials in the cross-sectional surface can also be changed round so that there is a non-magnetic core and a permanent magnetic shell. This would have the advantage that the angle sensors would be attached closer to the permanent magnetic part and higher field strengths act on the angle sensors.

If the non hard magnetic core of the cross-section is made from a soft magnetic mechanically stable material it helps at the same time to eliminate errors through mechanical stress and to increse the magnetic field strength in the vicinity of the measuring rod.

In another embodiment, the inner non permanent magnetic part of the cross-section of the measuring rod is not circular but has a shape which makes it particularly resistant to mechanical deformation. It is thus also unnecessary for the permanent magnetic part of the cross section to surround completely or approximately the mechanically stable part.

A particular advantage when using the length measurement system according to the invention is that after the failure of the electric supply there is no need to undertake any standardization of the measurement system since a position is assigned to each magnetization angle. Obviously the length measurement system can also be used for purposes where the aim is not immediately to determine a length or a position but is to be used to obtain a different value, for example the weight of a seat occupant. This information can be utilised to control airbags. Thus the measurement system is particularly suitable for use in conjunction with the adjusting mechanism of an adjusting device for a motor vehicle.

Naturally dynamic parameters such as speed and acceleration can also be determined with the length measurement system according to the invention analogous with the known impulse counting measurement principles (e.g. with the combination of a rotating ring magnet and Hall element). For this it is only necessary to take into account the path stretches which can be reproduced between the different magnetization angles with the corresponding adjustment time.

Furthermore the new length measurement system is also suitable for carrying out a so-called inherent diagnosis, since a clear determination of the position of an adjusting part is possible after a breakdown. As a result of such an inherent diagnosis an adjusting system (for example an electrically operated window lifter or vehicle lock) could be moved for example from normal operation to emergency operation in order to minimize the risks for the user. Thus for example the window pane could be stopped from automatically rising up in order to reduce the risk of jamming, or for a vehicle lock the function "save" is cancelled to prevent a passenger from becoming locked in.

The invention will now be explained in further detail with reference to the embodiments illustrated in the drawings in which.

Figure 1:
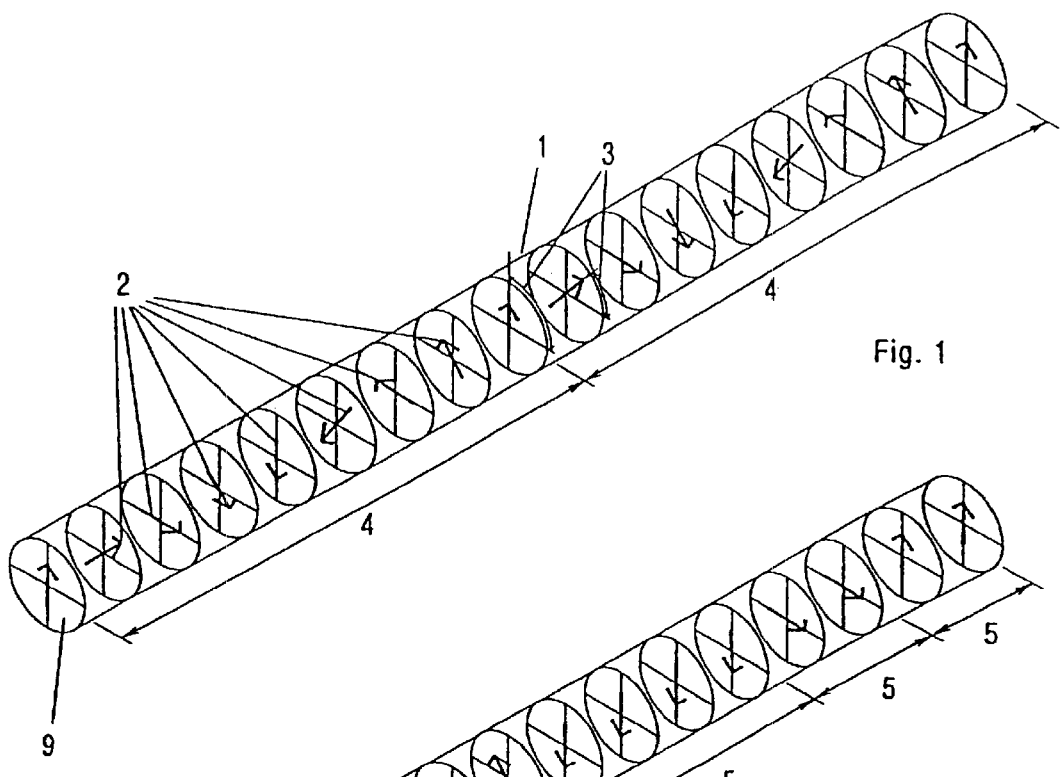
FIG. 1 shows a circular measuring rod with the direction of magnetization in the cross-sectional surface.

With reference to FIG. 1, a permanent magnetic measuring rod 1 has a circular cross-section 9. It is magnetized so that the direction of magnetization 2 lies in the surface of the cross-section 9. The cross-section 9 extends perpendicular to the longitudinal direction of the measuring rod 1 which coincides with the direction of measurement. The magnetization 2 is directed perpendicularly upwards at the starting end of the measuring rod 1. As one continues in the direction of measurement so the direction of magnetization 2 rotates clockwise with a continuously changing angle 3. After a specific length 4, which with a constant angular change with the unit of length in the direction of measurement corresponds to one full period of rotation for the direction of magnetization 2, the starting direction of the magnetization 2 is reached once more. The overall length of the measuring rod 1 contains in FIG. 1 two period lengths 4 so no absolute position information exists compared with a measuring rod having less than one period length (see FIG. 3). The magnetic field close to the measuring rod 1 is determined by the magnetization of the measuring rod 1. If the period length 4 is large compared with the diameter of the cross-section 9 the magnetic field direction is situated substantially in the plane of the relevant cross-section 9. Its direction in this plane is determined by the direction of the magnetization 2 which is applicable here. The magnetic field strength is with a certain radius round about the measuring rod 1 approximately independent of the angle 3.

Figure 3:
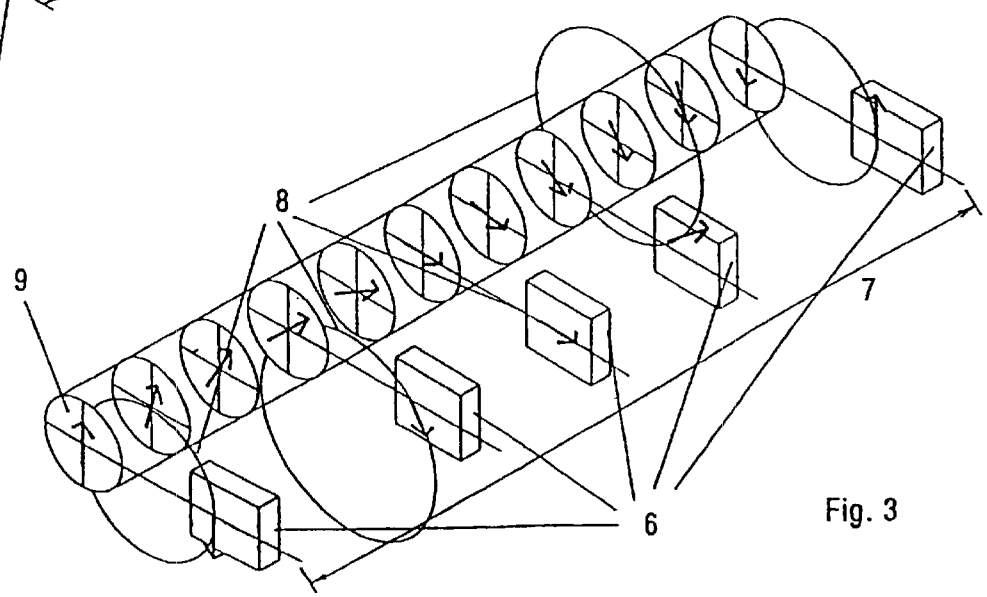
FIG. 3 shows a measuring rod with an angle sensor mounted close by in five possible successively timed positions.

FIG. 3 shows which path the magnetic field lines 8 have in the vicinity of the measuring rod 1 and which direction the magnetic field has in the chip face of an angle sensor 6 which is movable at a certain distance relative to the measuring rod 1. The angle sensor 6 is shown in the five positions which it can occupy in timed succession. As is apparent from the magnetic field directions which were determined at each location of the sensor 6 from the direction of the field lines the magnetic field next to the measuring rod 1 rotates in the opposite direction of rotation to magnetization 2. Each relevant position can be clearly determined from the angle so long as each angular value of the field direction and thus also the angle 3 of the direction of magnetization occurs only once over the entire length of the measuring rod 1. Thus in general one rotation of the direction of magnetization about up to 360° can be used so far as the angle sensors indicate the actual angle of the direction.

In a special case angle sensors are used which utilize the anisotropic magnetoresistive effect. Angle sensors of this kind are known. They supply an output signal which is proportional to the sine of the double angle between the field direction and one edge of the sensor chip and an output signal which is proportional to the cosine of the double angle between the field direction and the edge. Thus a clear association between the angle of the magnetic field direction and thus the direction of magnetization 2 is still only possible for a range of 180°. This restriction on its effective action is lifted if when using anisotropic magnetoresistive sensors the increase in the angle 3 of magnetization 2 per unit of length in the direction of measurement is reduced to half.

The measurement resolution is also twice as great on account of the proportional relationship with the sine and cosine of the double angle so that the same resolution is ultimately obtained. Advantageously in each case the high magnetic field sensitivity of the anisotropic magnetoresistive sensors has an effect which has the result that even where there are greater distances between the sensor 6 and measuring rod 1 an angular measurement is possible with minimum error.

Figure 2:
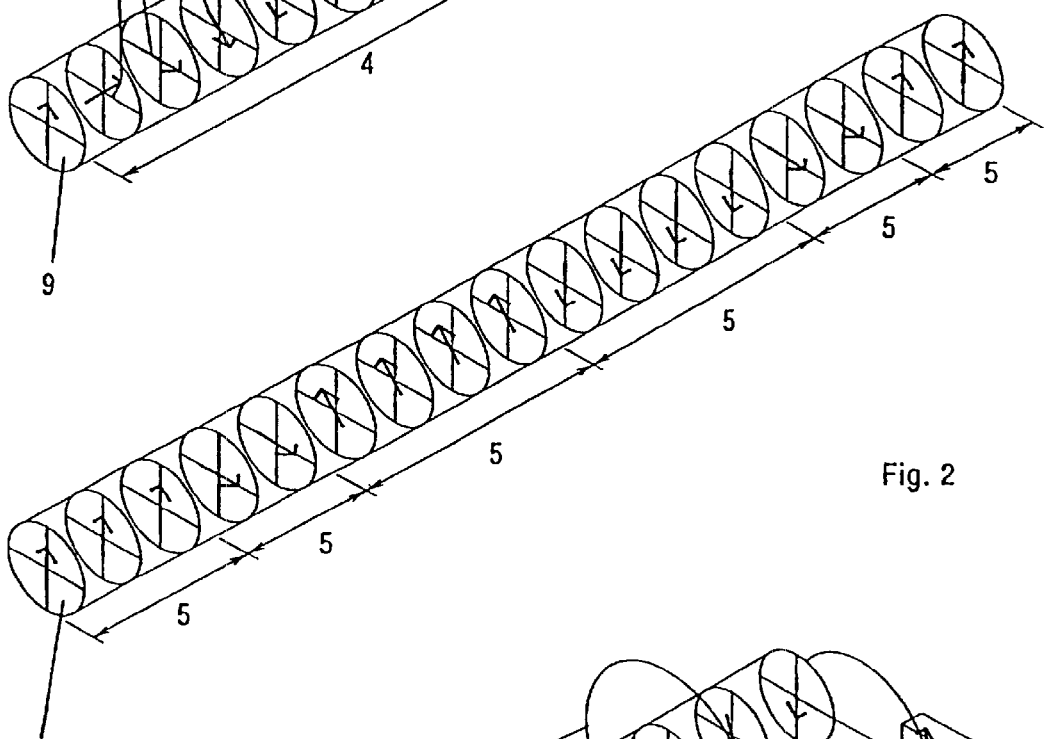
FIG. 2 shows a circular measuring rod with regions of constant direction of magnetization.

FIG. 2 shows a measuring rod 1 in which—deviating from the subject of the present invention—the direction of magnetization 2 is set constant in greater regions 5 which extend in the direction of measurement. A certain numerical value is assigned to each direction of magnetization. In the example in FIG. 2 there are four different directions. Here four different numerical values can arise in each region and are designated 0, 1, 2 and 3. Over the length of the six illustrated regions different numbers can be represented by these four numerical values in six places 4056. If all the regions 5 have the same length each of 1 cm and the following number always differs from the previous number by 1 then a length of 6 cm×4056=243 m can be coded and measured on detection of the relevant number through twelve angle sensors at a distance of half the length of one region with a resolution and accuracy of 1 cm. Further known types of coded representation for the lengths can be used.

Through the clear ability to distinguish the angles and assign ten different numerical values to ten different angles, coding is also possible directly in the decimal system and saves recoding for the display unit showing the measurement result.

Figure 4:
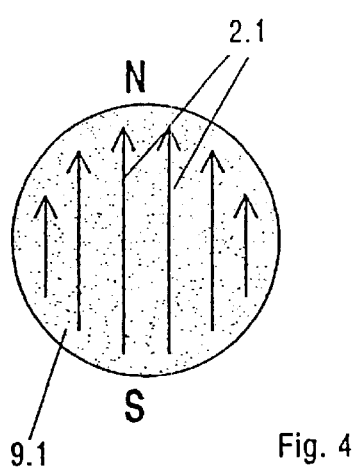
FIG. 4 shows a homogeneously magnetized cross-section of a measuring rod.

The cross-section of a measuring rod 1 designed according to the invention can have different geometric shapes and magnetization. FIG. 4 shows the circular cross-section 9.1 used in the embodiments described up until now and in which the magnetization lines run parallel to each other. Thus there is north pole N for half the circle circumference and south pole S for the other half. The illustrated cross-section represents the path of the magnetization at a specific position along the measuring rod 1. At other positions the direction of magnetization has been rotated by an angle compared to that shown. If the simple magnetization pattern shown is rotated 360° along the direction of measurement then the direction of the magnetic field is likewise rotated 360° in the reverse direction of rotation on a parallel to the axis of the measuring rod 1 in the vicinity of the measuring rod 1.

Figure 5:
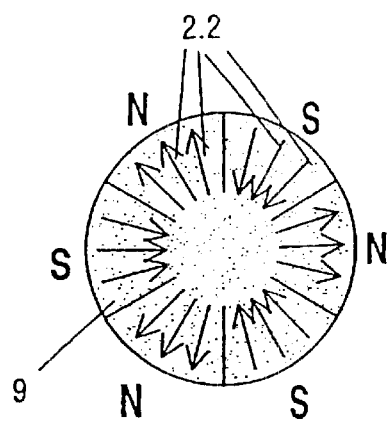
FIG. 5 shows a multi polar magnetized cross-section of a measuring rod.

FIG. 5 shows a six-pole magnetization pattern in cross-section 9 in a certain position. The magnetization lines 2.2 run radially and are directed towards the circle circumference in the region of the north poles N and towards the circle centre in the region of the south poles S. In the direction of measurement there is an increasing rotation of the magnetization pattern compared to that shown. If the illustrated magnetization pattern is rotated about 120° along the direction of measurement then the direction of the magnetic field is already rotated about 360° in the reverse direction on a parallel to the axis of the measuring rod 1 in the vicinity of the measuring rod 1. With the same increase in the angle of rotation of the magnetization pattern with the length unit in the direction of measurement as in the case of the magnetization pattern according to FIG. 4, a triple length resolution is provided here when using the same angle sensor. The clear association with the position of the sensor 6 along the measuring rod 1 is only possible for a rotation of the magnetization pattern of 120°. For a rotation of the magnetization pattern about 360° three periods are provided for the output signal of the sensor. The position measurement over this entire region is thus only possible incrementally.

Figure 6:
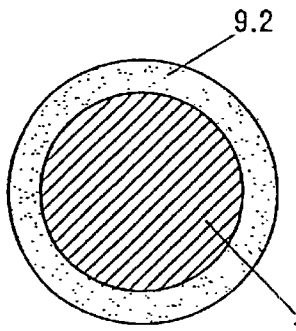
FIG. 6 shows a cross-section through a measuring rod with concentric parts of permanent magnetic and non permanent magnetic material.

In the cross-section shown in FIG. 6 only the outer ring 9.2 consists of a hard magnetic material which supports a magnetization pattern which is rotated increasingly as one advances in the direction of measurement. In the inner part 10 of the cross-section there is mechanically stable soft magnetic material. As a result of the high magnetic permeability of the soft-magnetic material the field strength is increased in the vicinity of the measuring rod up to a maximum of double at least in the case of multi-polar magnetization patterns, which helps to increase the accuracy of the angle measurement. The high torsional resistance of the mechanically stable material substantially prevents torsion of the measuring rod 1 under the effect of mechanical forces and thus prevents angular errors of the measuring rod 1 caused by these forces. Since the inner part 10 of the cross section has a good torsion resistance it is also possible to use relatively soft plastically bonded hard magnetic material for the outer ring 9.2.

Figure 7:
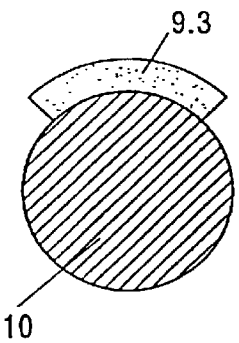
FIG. 7 shows a cross-section through a measuring rod wherein the permanent magnetic material does not enclose the nonmagnetic material.

FIG. 7 shows a further possible cross-section for a measuring rod 1. A ring section 9.3 of hard magnetic material is fitted on a circular rod 10 of non-magnetic torsion-resistant material. The ring section is magnetized multi-polar in the radial direction. As one advances in the direction of measurement the magnetization pattern is increasingly rotated. Above the ring section there is an angle sensor which establishes the direction of the magnetic field and which is movable on a line parallel to the axis of the circular rod 10. From the angular value the position is determined in the direction of measurement which runs along the line.

Figure 8:
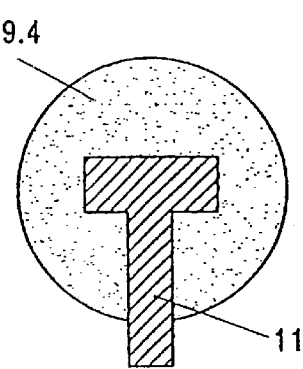
FIG. 8 shows a cross-section through a measuring rod with a mechanically resistant profile of the non permanent magnetic part.

FIG. 8 shows a further cross-section of the measuring rod 1. In the roughly circular hard magnetic material 9.4 there is a T-shaped part 11 of a non-magnetic material with high coefficient of elasticity. The magnetization pattern (not shown in FIG. 8) of the hard magnetic material 9.4 is again rotated increasingly as one advances in the direction of measurement. The T-shaped part 11 prevents the measuring rod 1 from sagging in the event of forces engaging in the cross-sectional plane along the measuring rod 1 and thus helps to prevent any subsequent measuring faults in the angular value.

Figure 9:
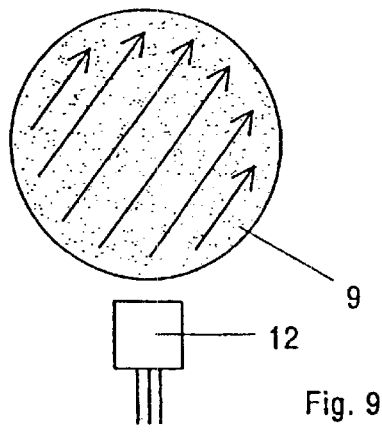
FIG. 9 shows a measuring rod with one angle sensor.

The arrangement of a magnetoresistive angle sensor 12 in the plane of the cross-section 9 of the measuring rod 1 is shown in FIG. 9. The chip plane of the magnetoresistive angle sensor 9 lies in the same plane as the cross-section 9. The angle sensor is movable relative to the measuring rod 1 on a line parallel to the axis of the measuring rod 1.

Figure 10:
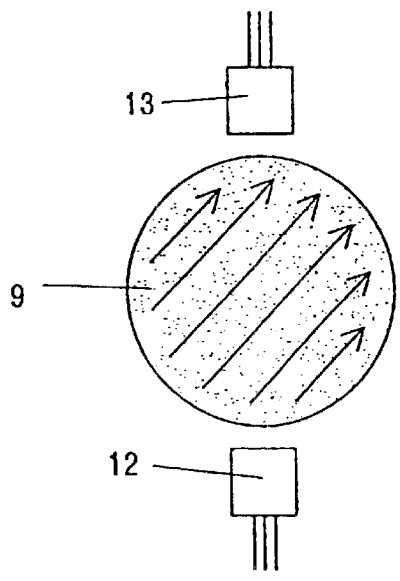
FIG. 10 shows a measuring rod with two angle sensors in the plane of the cross-section of the measuring rod.

FIG. 10 shows the arrangement of two anisotropically magnetoresistive angle sensors 12 and 13 for the direction of the magnetic field. The two angle sensors 12 and 13 lie opposite one another close to the cross-section 9 of the measuring rod 1. The magnetization of the cross-section 9 of the measuring rod 1 is homogeneous. If the connecting line of the centre points of the two angle sensors passes precisely through the centre point of the cross-section 9 then the two angle sensors indicate the same angular value. If the connecting line is however moved sideways to the right relative to the centre point then the angle sensor 13 shows an angular value which is increased by a certain amount. The angle sensor 12 indicates an angular value which is reduced by the same specific amount. The mean value of the two measured values always produces the correct angular value for the direction of the magnetic field for all displacements. The arrangement with two angle sensors thus eliminates the need for accurately adjusting the position of the sensors relative to the position of the measuring rod 1 and prevents errors which can be caused when the sensor holder is displaced sideways relative to the measuring rod 1.

Figure 11:
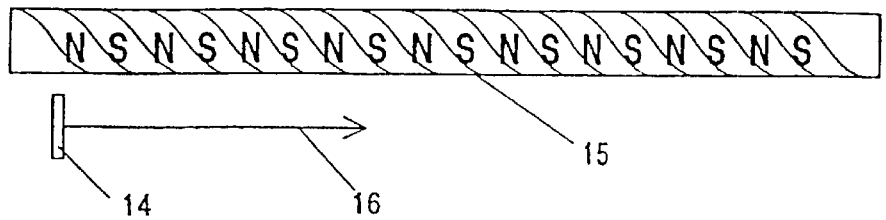
FIG. 11 shows a side view of a length measurement system with uniform period length of the rotation of magnetization.

FIG. 11 shows a length measurement system which consists of an incremental measuring rod 15 which is magnetized homogeneously in its cross-sectional surface and in which the direction of magnetization is turned increasingly in the direction of measurement 16 with a linearly rising angle, and of an anisotropically magnetoresistive angle sensor 1 which is displaceable in the direction of measurement 16. In the illustrated case the magnetization is rotated eight times 360° over the entire length of the incremental measuring rod 15. Since the anisotropically magnetoresistive angle sensor 14 indicates the double angle of the field direction the output signal of the sensor 14 is repeated periodically 16 times over the total length of the measuring rod 15. With the length measurement system illustrated an indication of the position is thus only possible if in addition to the angle indicated the number of periods covered from the starting end of the incremental measuring rod 15 is also determined. An absolute length measurement system is obtained from that shown in FIG. 11 if a second measuring rod of the same length is attached parallel to the incremental measuring rod 15 and whose magnetization is rotated only by 180° over the total length. A further anisotropically magnetoresistive angle sensor is attached with the first 14 in the same plane perpendicular to the direction of measurement 16 and measures the field angle of the second measuring rod from which it can be clearly concluded in which periods of the incremental measuring rod 15 the sensor arrangement is exactly located. From the angular values of the two sensors it is possible to indicate absolutely the corresponding position without moving the sensor arrangement relative to the measuring rods. This is possible with high resolution and precision through the plurality of period lengths of the incremental measuring rod 15.

Figure 12:
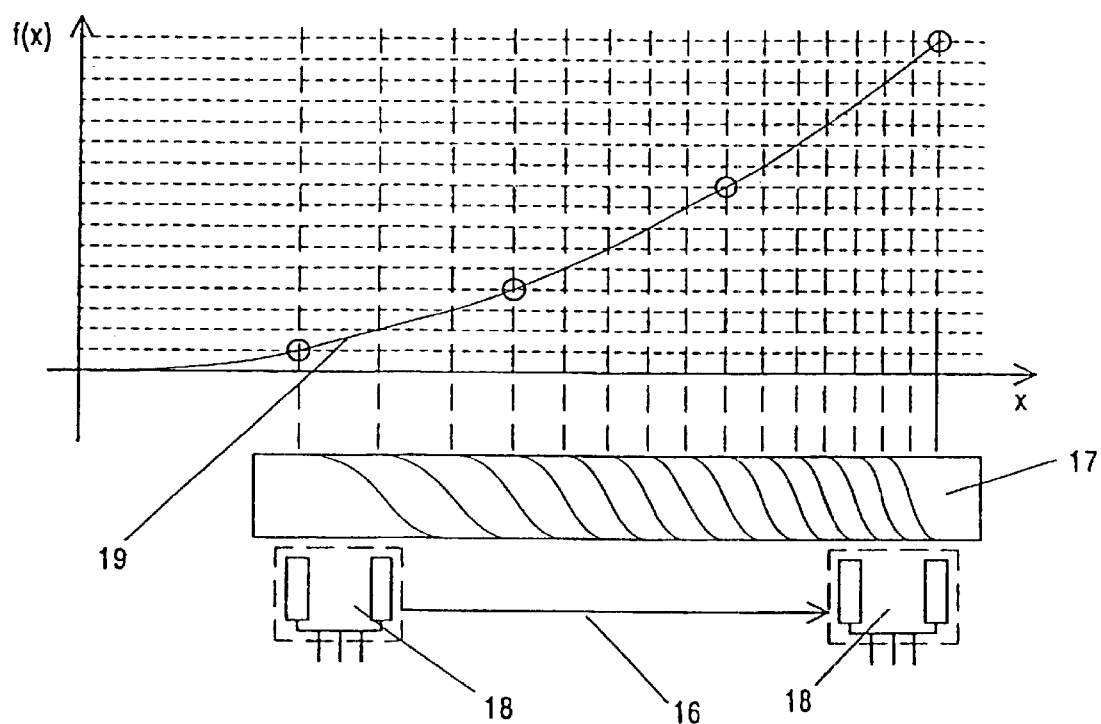
FIG. 12 is a side view of a length measurement system having two angle sensors off-set relative to each other in the direction of measurement and with a chart showing the quadratic angular increase with the position.

FIG. 12 shows a length measurement system with a measuring rod 17 and an angle sensor arrangement 18 which is shown in two positions occupied temporally in succession. The magnetization of the cross-section of the measuring rod 17 is homogeneous. The increase in the angle of rotation f(x) of the direction of magnetization with the position x in the direction of measurement 16 takes place quadratically, as can be seen in the graph on the illustration of the length measurement system. The spacing of the two angle sensors of the angle sensor arrangement 18 coincides with the period length at the starting end of the measuring rod 17. Therefore here two sensors show the same angular value and the difference between the two angular values is nil. The further the sensor arrangement is moved in the direction of measurement 16 so the greater the difference becomes in the two angular values. Owing to the quadratic increase in the angular rotation of the magnetization of the measuring rod 17, the angular difference is a linear function of the position. The angular difference remains below 360° and thus clearly, when the measuring rod 17 stops there, where the spacing of the two angle sensors coincides with the length over which magnetization rotates about 7200. If longer measuring rods are used then it is no longer possible to indicate absolute length, but rather incremental systems can be used. The particular advantage of the length measurement system according to FIG. 12 is that the measuring rod 17 can be rotated as a whole in any manner about its axis without affecting the result of measurement since through the two existing angle sensors in the angle sensor arrangement 18 only angular differences between the two sensors are still determined and not the angle of magnetization relative to a spatially fixed straight line in the cross-section of the measuring rod 17.

Figure 13:
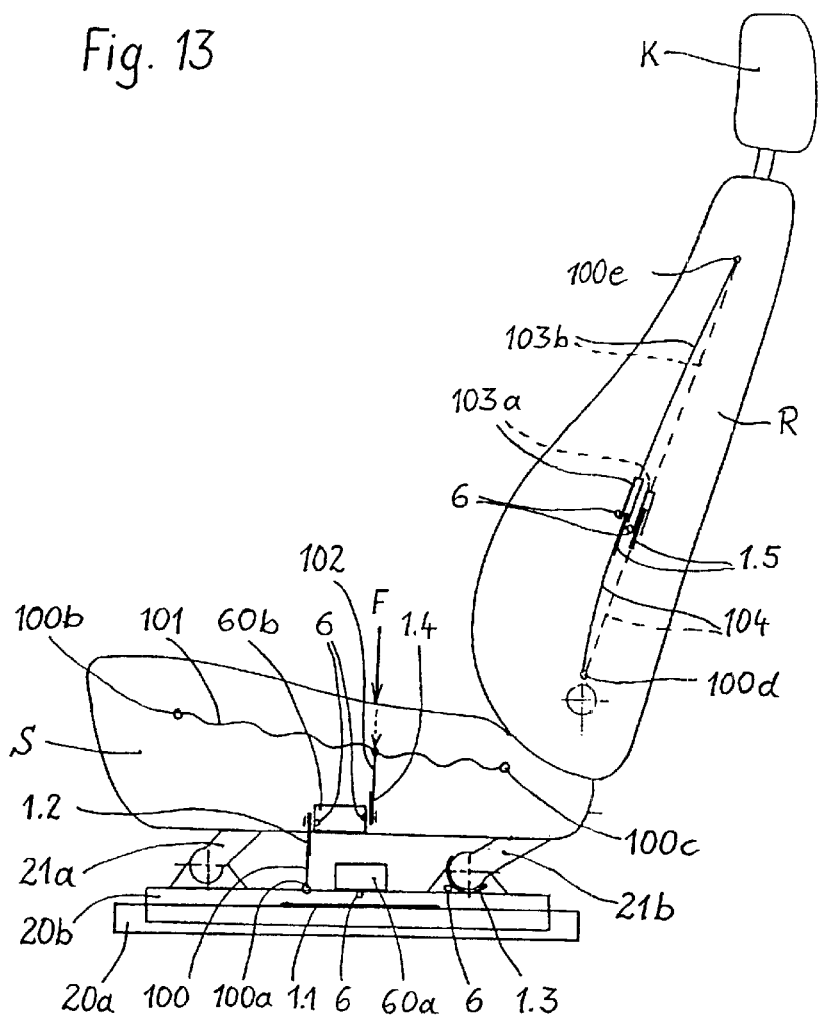
FIG. 13 shows a diagrammatic side view of a length and height adjustable vehicle seat having several measurement systems according to the invention.
Figure 14:
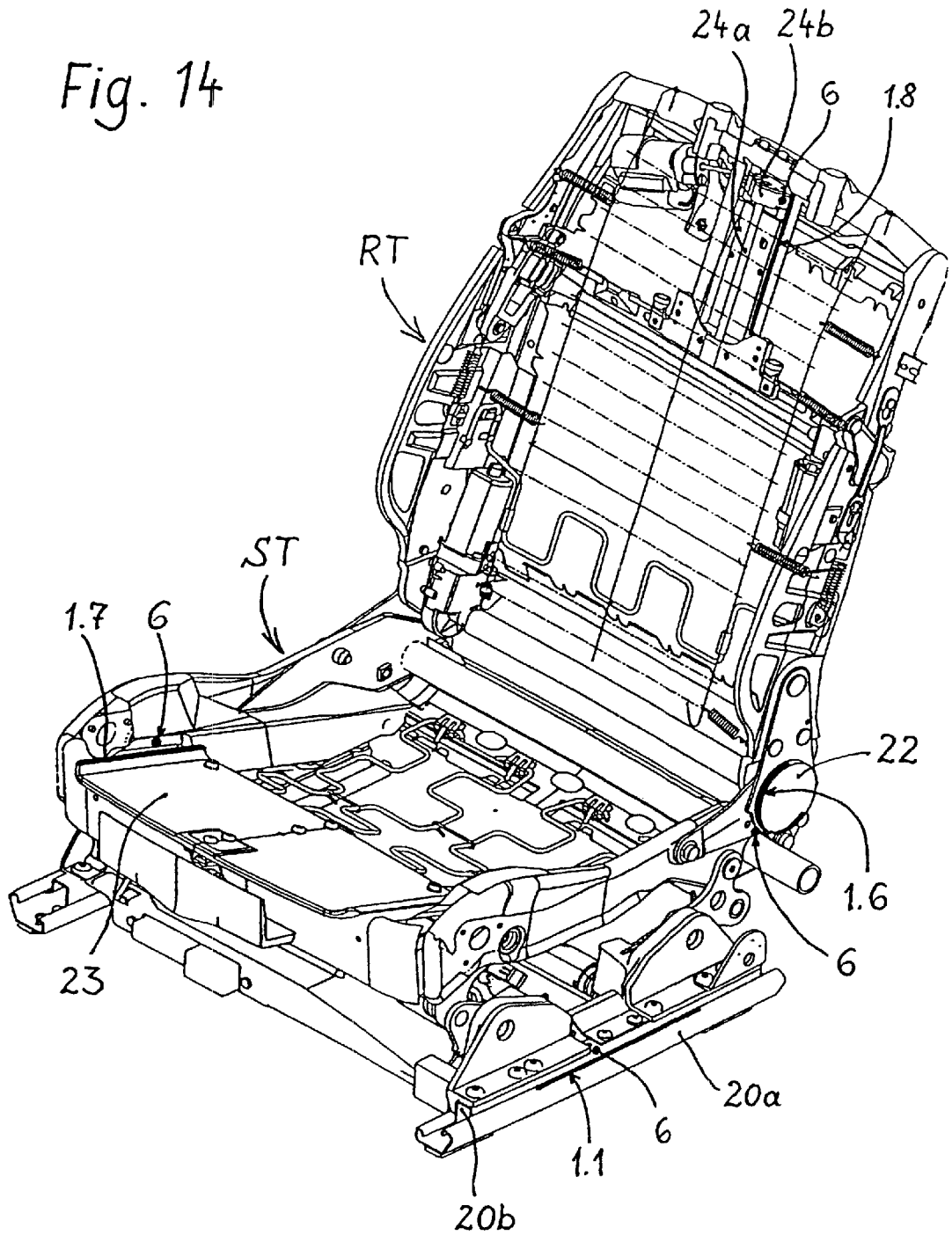
FIG. 14 shows a perspective view of the metal structure of a vehicle seat with several measurement systems according to the invention shown diagrammatically.

FIGS. 13 and 14 show some examples for using the length measurement system for a vehicle seat where it can be in particular a constituent part of a device for adjusting the length, height or incline of the seat or for adjusting the height of the head restraint or the depth of the seat cushion.

Thus for example the measuring rod 1.1 is connected to a guide rail 20*a* fixed on the vehicle floor for a horizontal seat adjustment device or to another part fixed on the vehicle floor whereby the measuring rod 1.1 extends substantially in the direction of displacement of the seat. The sensor 6 is connected to a part fixed on the upper rail, e.g. to a cover panel (not shown) or it is a constituent part of an associated electronics control unit 60*a*.

In a further embodiment FIG. 13 shows a measuring rod 1.2 for determining the seat height wherein the rod extends substantially vertical and is mounted by a connecting rod 100 in the articulated joint 100*a* on the upper rail 20*b* which is not vertically adjustable relative to the vehicle floor. The associated sensor 6 is integrated in the electronics control unit 60*b* which is fixed on the seat cushion support (ST). When adjusting the seat height through the incline of the front and rear articulated lever 21*a*, 21*b* the measuring rod 1.2 is displaced relative to the sensor 6. The simultaneous relative movement in the X-direction (travel direction) can be compensated through the articulated joint 100*a* or through an elastically formed connecting rod. Superimposition of the two movements as a result of the selected structural displacement kinematics is obviously taken into consideration during evaluation of the measured signals.

Basically the seat height can also be determined through the incline angle of a swivel lever 21*b* if the measuring rod 1.3 is formed and arranged in a circular arc relative to the swivel axis of the lever 21*b* and the associated sensor 6 is connected to a part (e.g. an electronics control unit) fixed on the upper rail 20*b*.

It is possible to determine the incline of the backrest R in an analogous way. To this end the measuring rod 1.6 is connected to a rotatably mounted gear element of a device 22 for adjusting the incline of the backrest whilst the associated sensor 6 is connected to a part fixed on the gear housing. The measuring rod 1.6 can however also be connected to a part fixed on the backrest, the so-called backrest fitment, and the associated sensor (6) can be connected to a part fixed on the underneath frame of the seat, or vice versa. Finally it is only a matter of sensing the relative movement between the backrest support RT and the seat cushion support ST.

According to a further embodiment the measuring rod 1.7 is connected to the thigh rest 23 of a seat cushion depth adjuster and the associated sensor 6 is fixed on the seat cushion support.

In order to control the head restraint adjustment in the embodiment of FIG. 14 there is a measuring rod 1.8 which is fixedly connected to the backrest support RT and is associated with a sensor 6 which is connected to the gearing 24*b*. The sensor 6 can however also be a constituent part of an electronic control unit which is locally fixed relative to the backrest support RT when the associated measuring rod is connected to a part connected to the movable head restraint.

If the length measurement system is to be a constituent part of a device for detecting occupancy of the seat or for sensing the occupancy weight then a measuring rod 1.4 which is fixed on a seat spring 101 through a connecting rod 102 can be guided substantially vertically along an electronic control unit 60b. The control unit 60b has a sensor 6 which generates the measuring signals of the measuring rod 1.4 which is displaceable relative thereto. The measuring rod 1.4 is displaced when the seat spring 101 mounted in the articulated joints 100b, 100c sags as a result of the weight of a user. The translational displacement of the measuring rod 1.4 which thereby results corresponds in terms of measurement to the weight load.

In order to be able to differentiate reliably between the seat being occupied by a person and the seat being occupied by other objects of comparable weight, a suitably designed measurement system can also be incorporated in the back rest. According to FIG. 13 the measuring rod 1.5 is mounted at the free end of a connecting rod 104 which is fitted in the articulated joint 100d and is guided in a guide sleeve 103a which is fixed in the joint 100e at the upper end of the backrest R through a connecting rod 103b. In the event of load on the backrest R the parts 1.5, 103a, 103b, 104 are pressed backwards so that their curved contour becomes more and more flattened and the measuring rod 1.5 is pushed further into the guide sleeve 103a. The sensor 6 which is fixed on the guide sleeve 103a thus picks up the measurement signals connected therewith and directs these on to an evaluation unit.

Figure 15A:
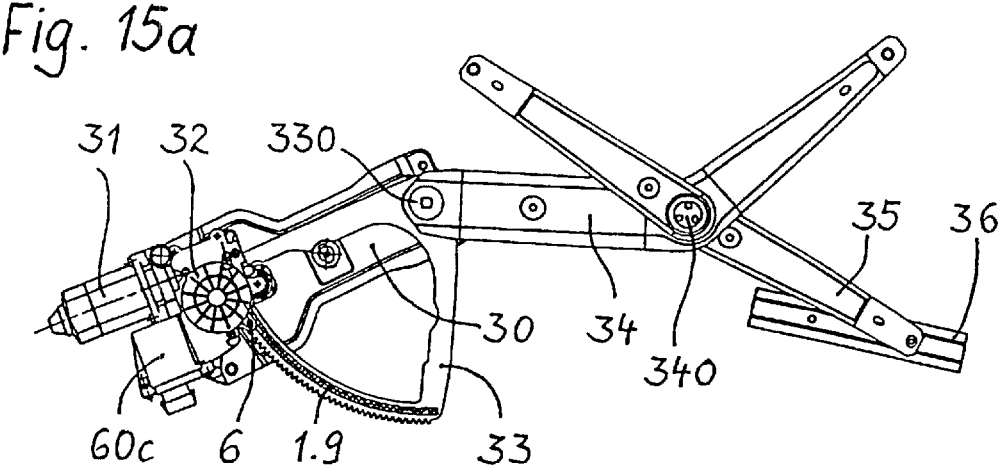
FIG. 15a shows a cross arm window lifter having a magnetic measuring rod extending along the cogged area.
Figure 15B:
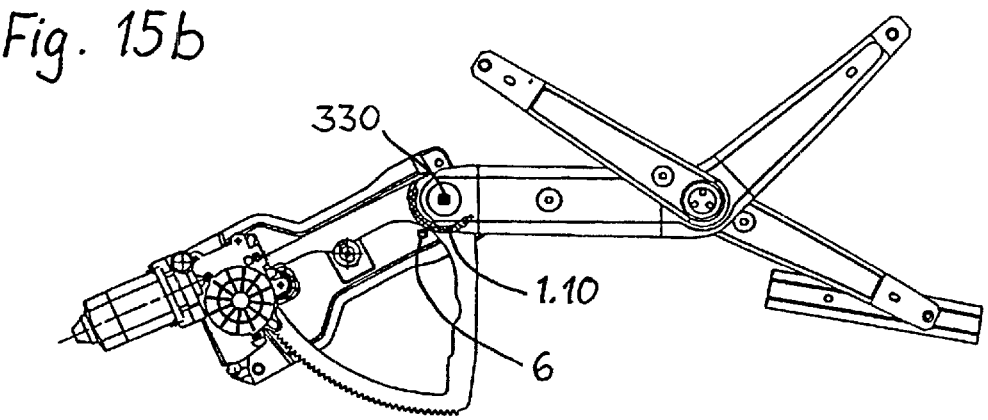
FIG. 15b shows a cross arm window lifter having a magnetic measuring rod extending arcuate close to the swivel axis of the toothed segment lever.
Figure 15C:
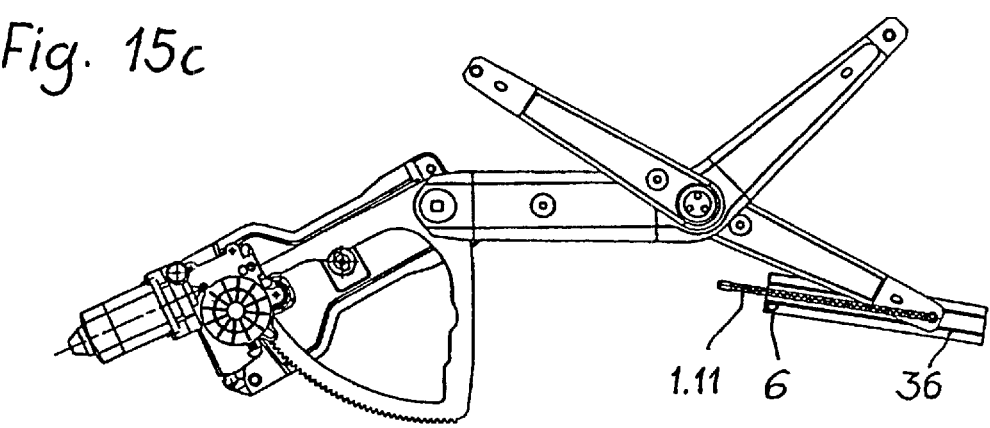
FIG. 15c shows a cross arm window lifter having a magnetic measuring rod which is movable along the guide rail of the compensation lever.

FIGS. 15a to 15c show different variations of the integration of the length measurement system into an adjustment device of a window lifter. According to a first variation the measuring rod 1.9 extends parallel to the serration of the toothed segment lever 33 which is mounted rotatable on the base plate 30 in the axis 330 and is fixedly connected to the drive lever 34. In the cross joint 340 the drive lever 34 is connected for articulated movement to the compensating lever 35 which has one end mounted displaceable in the guide rail 36. The free ends of the drive lever 34 and the compensating lever 35 are connected to the window pane through fastening elements (not shown). The toothed area of the toothed segment lever 33 engages with a pinion of the gearing 32 whose housing contains the integrated sensor 6 which is associated with the magnetized measuring rod 1.9. If the motor 31 is brought into operation the toothed segment lever 33 swivels about the axis 330 and thereby moves the measuring rod 1.9 past the sensor 6. The generated signals are evaluated by the electronics unit 60c and used to control the adjusting movement of the window pane.

In order to be able to evaluate the very important upper closing area with sufficient reliability a correspondingly higher resolution of the measuring rod can be provided in this area. Thus a sensitive action anti-nip protection can be ensured just like a so-called soft stop when reaching the end positions.

In the event that an electronic control unit is to be provided mounted away from the drive 31, 32 it can also be advisable to locate the magnetized measuring rod in a different position. For example an arcuate measuring rod 1.10 could also be mounted coaxial with the swivel axis 330 with which a sensor 6 is associated which is fixed on the base plate 30 (see FIG. 15b).

A further possibility (see FIG. 15c) lies in connecting a measuring rod 1.11 to the end of the compensating lever 35 guided in the guide rail 36 whereby the sensor 6 would be connected to the guide rail 36 or to another part fixed on the body. It should however be pointed out that the measuring rod 1.11 is moved to and fro twice in the guide rail 36 on moving through the entire displacement path of the window pane so that only the upper or lower half of the displacement path can be clearly monitored, unless through additional information there is an indication on whether the adjustment mechanism is located in the lower or upper half of the displacement path.

Figure 16:
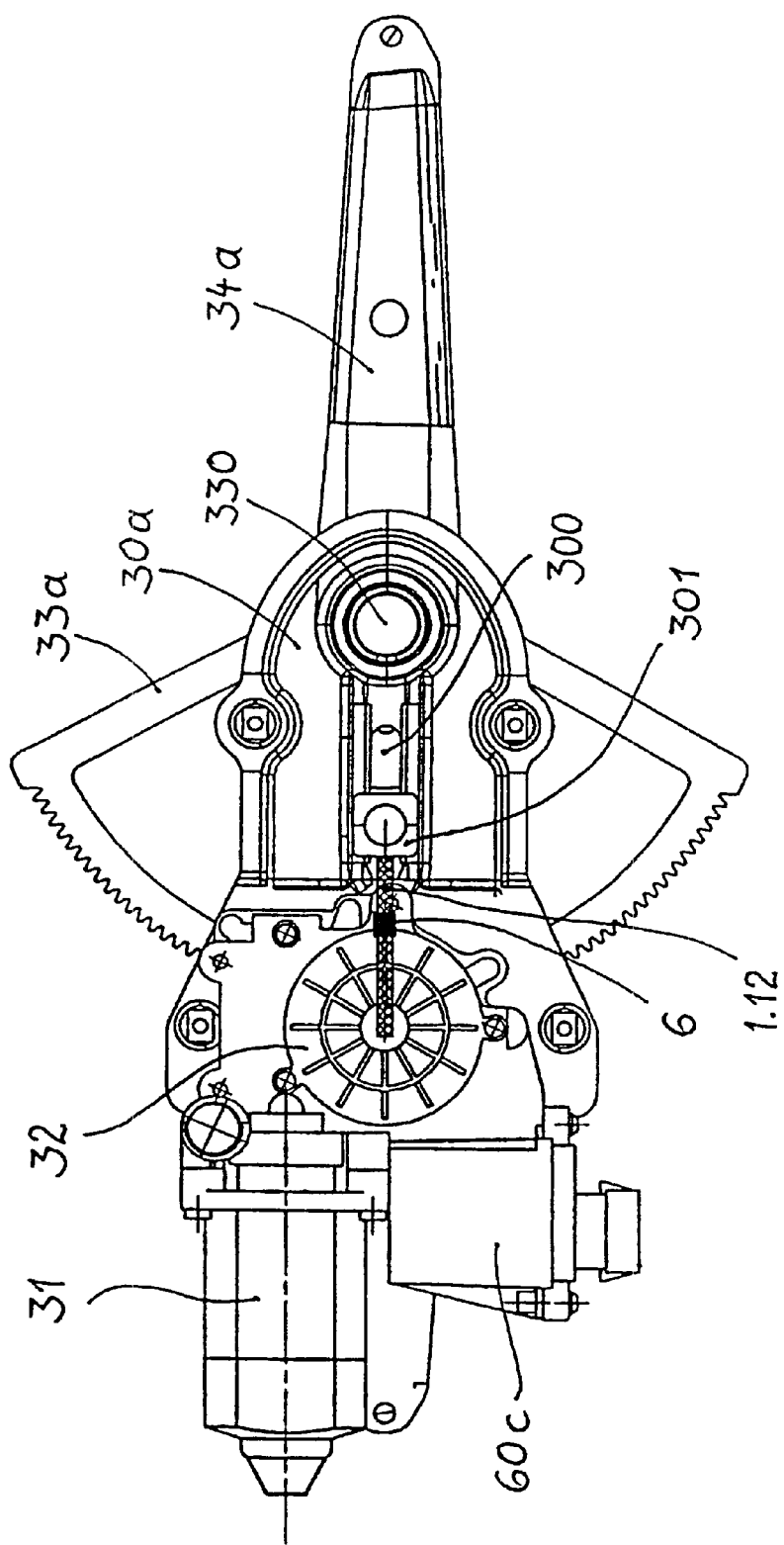
FIG. 16 shows a single arm window lifter having a displaceable magnetic measuring rod which is coupled to the drive.

The illustration in FIG. 16 shows diagrammatically that the measuring rod 1.12 is in active connection with the gearing 32 through gearing associated with the measuring device and by means of which synchronised displacement of the window pane and measuring rod 1.12 is guaranteed. To this end the measuring rod 1.12 is fixed on the slider 301 displaceable in the slide carriage 300 of the base plate 30a. The associated sensor 6 is integrated in the housing of the gearing 32; the measuring signals are evaluated in the electronic control device 60c.

Figure 17A:
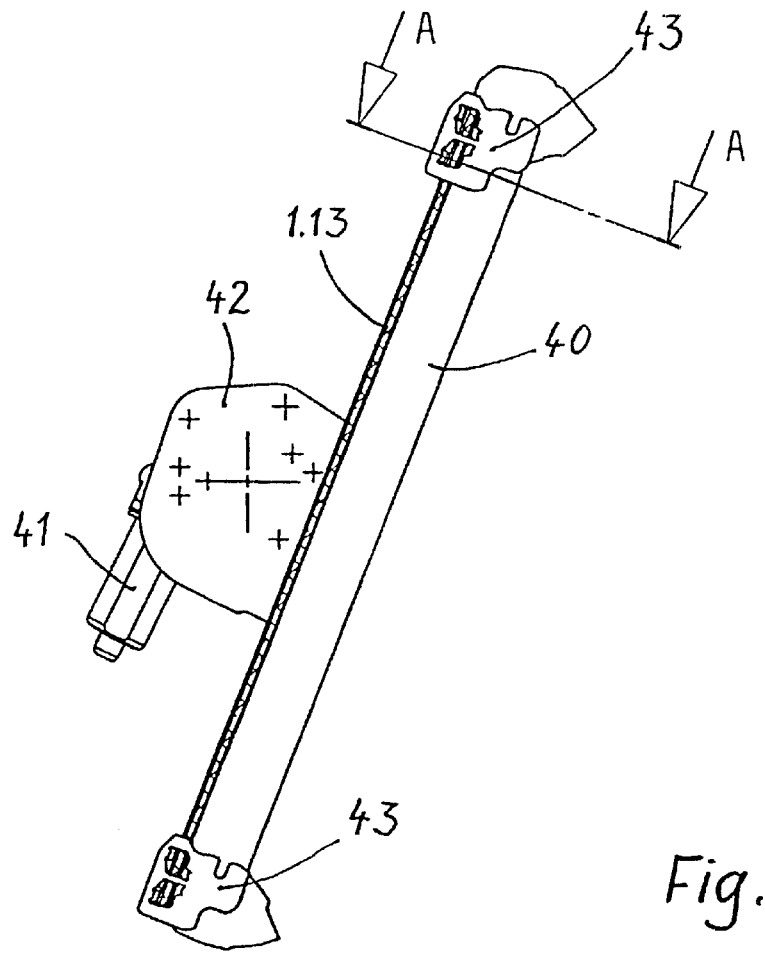
FIG. 17a shows a side view of the guide rail of a cable window lifter having a magnetic measuring rod extending in the direction of displacement.
Figure 17B:
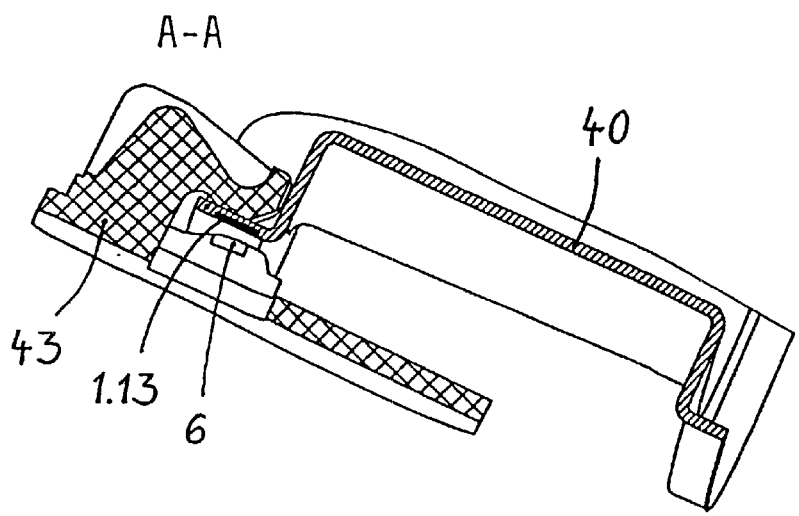
FIG. 17b is a sectional view through the guide rail in the region of the follower which is connected to the window pane.

The diagrammatic illustration of FIG. 17a shows a guide rail 40 of a cable window lifter on which a follower 43 is mounted displaceable for a window pane. A magnetized measuring rod 1.13 extends along the guide rail 40 and a sensor 6 integrated in the follower 43 is associated with the measuring rod (see also FIG. 17b). Passing the sensor signals on to a control electronics (not shown) can take place wirelessly through a movable cable lead or through a suitable transmitting device. For supplying power to this transmitting device which is integrated in the follower 43 slip contacts can be provided which extend along the guide rail 40 and which are preferably connected through a plug contact to a source of energy 42 which serves for contacting the motor 41.

Figure 18A:
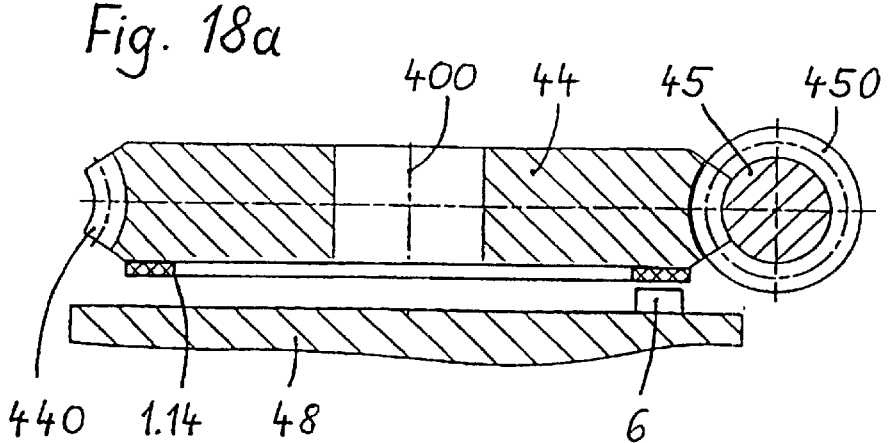
FIG. 18a is a diagrammatic view through a drive having a ring-shaped magnetized element.

FIG. 18a shows a worm wheel 44 which is fitted with a ring-shaped measuring rod 1.14 wherein the measuring rod 1.14 is connected as a separate part to the worm wheel 44 or is formed integral on the worm wheel through multi-component injection moulding technology. The shape of the measuring rod can be adapted substantially to the given requirements. Likewise the magnetized area can be integrated fully into the worm wheel 44 so that there are no laterally protruding areas. The associated sensor 6 is fixed on the gear housing 48 or the like.

Figure 18B:
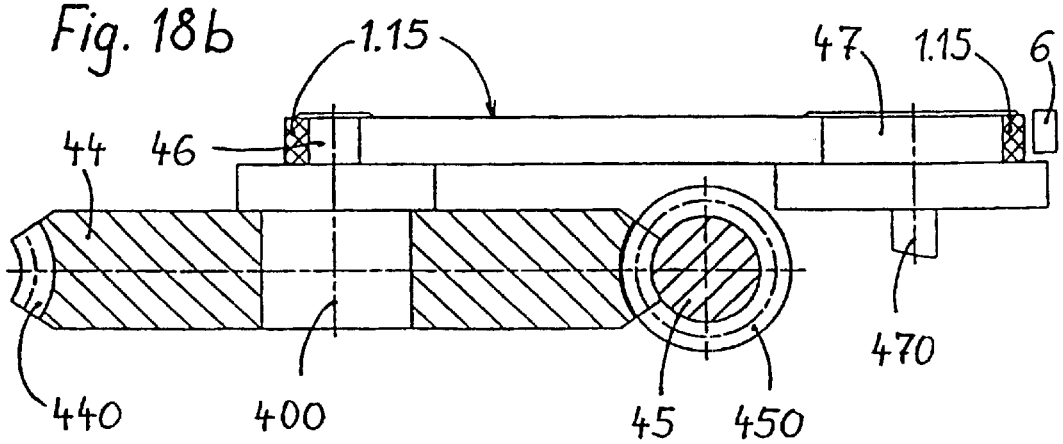
FIG. 18b is a diagrammatic view of a drive having a magnetized element in the form of a peripheral belt.

The embodiment of FIG. 18b also has a worm wheel gearing with a worm 45 which engages in the teeth 440 of the worm wheel 44. A roller 46 with comparatively small diameter is mounted on the axis 400 of the worm wheel and serves to guide a measuring rod 1.15 in the form of a flexible closed circumferential belt or the like which is guided over a roller 47 which is mounted on the axis 470. Close to the axis 470 there is a sensor 6 which is preferably fixed on the housing and is associated with the circumferential magnetized belt 1.15. As a result of the fact that the diameter of the roller 46 is very much smaller than the diameter of the worm wheel 44 a number of revolutions of the worm wheel can be conducted until the belt has completed one complete revolution. Thus any position can be clearly assigned for any such adjustment path undertaken.

Figure 19:
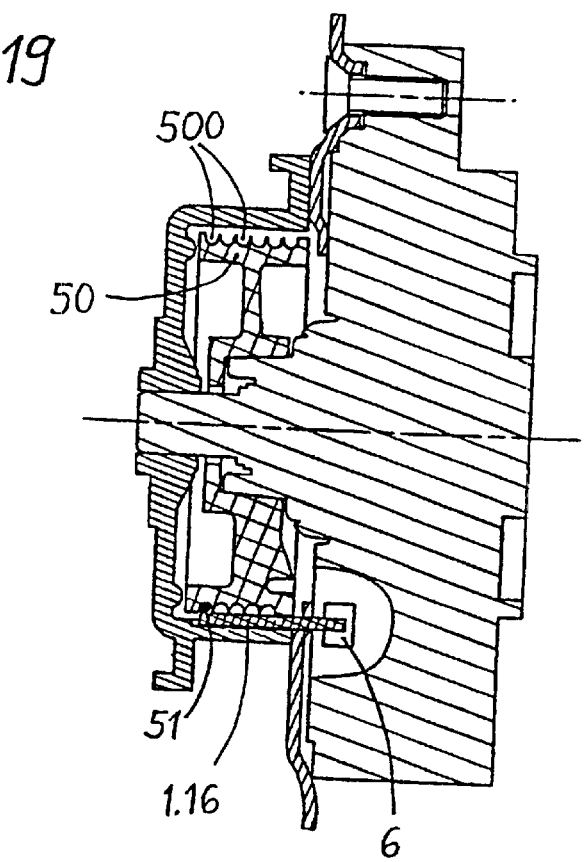
FIG. 19 is a diagrammatic view through a drive having a cable drum and a magnetic measuring rod which is displaceable across the axis of rotation.
Figure 20:
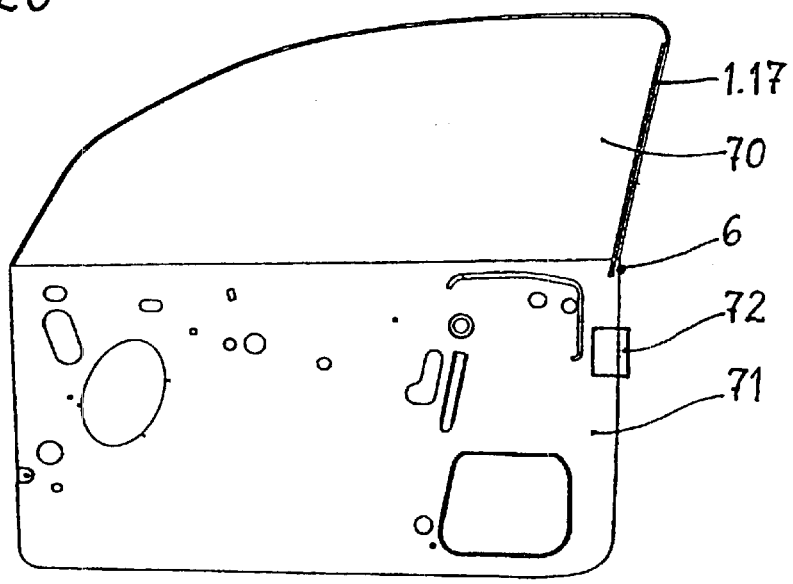
FIG. 20 shows a vehicle door having a magnetic measuring rod mounted on the vertical edge of the window pane.

FIG. 19 shows diagrammatically a drive with a cable drum 50 whose circumferential helical cable groove 500 engages with the magnetized measuring rod 1.16 through a cam 51. Rotation of the cable drum 50 leads as a result of the pitch of the helical cable groove 500 to an axial displacement of the measuring rod 1.16 which is sensed by a sensor 6 which is integrated in the housing of the drive unit. By taking into account the diameter of the cable drum it is possible to calculate the displacement path covered by the cable.

In order to control a window lifter the magnetized measuring rod 1.17 can also be mounted on an edge of a window pane 70 running substantially in the direction of displacement (see FIG. 19). The associated sensor 6 is placed in the door body 71 or an electronic control device. The advantage of this variation lies in particular in the fact that the setting behaviour of the adjustment mechanism cannot have any effect.

A further useful field for the length measurement system can be in vehicle door locks 72 in order to detect the closing position of the closing parts. Preferably the sensor should be mounted in a non-moving housing and the magnetized measuring rod should be fixed on a movable closing part or on a part connected therewith (e.g. operating rod).

At this point it should be pointed out that a one-piece integration of the magnetized measuring rod into a plastics part is possible in many cases by using multi-component injection moulding plastics technology, for example into a plastics guide rail of a window lifter, a cover panel for a seat rail or a decor element. It is also conceivable however to integrate or incorporate the function of the measuring rod into the injection moulded plastics formation of a toothed structure.

What is claimed is:

1. A length measurement system comprising:
   at least one magnetic measuring rod; and
   at least one magnetic field sensor which is displaceable relative to the at least one measuring rod in a direction of measurement,
   wherein magnetization of the at least one measuring rod has a component in a plane which is perpendicular to the direction of measurement,
   wherein a longitudinal position of the at least one magnetic field sensor relative to the at least one measuring rod can be determined from the direction of a component of magnetization, and
   wherein the direction of the component of magnetization is rotated along the direction of measurement so that to each longitudinal position of the at least one magnetic field sensor is assigned a respective direction of the component of magnetization inside the at least one measuring rod at this longitudinal position from which the longitudinal position can be determined.

2. The length measurement system according to claim 1, wherein an angle of the component of magnetization relative to a reference line which is perpendicular to the direction of measurement changes continuously as one advances in the direction of measurement.

3. The length measurement system according to claim 2, wherein the angle of the component of magnetization changes linearly and varies with a constant period length along the direction of measurement.

4. The length measurement system according to claim 1, wherein an angle of the component of magnetization relative to a reference line which is perpendicular to the direction of measurement is adjusted in areas stepwise as one advances in the direction of measurement.

5. The length measurement system according to claim 1, wherein the magnetization of a cross-section of a measuring rod is homogeneous.

6. The length measurement system according to claim 1, wherein the magnetization of a cross-section of a measuring rod is multi-polar.

7. The length measurement system according to claim 1, wherein a cross-section of the at least one measuring rod is circular.

8. The length measurement system according to claim 1, wherein a cross-section of the at least one measuring rod has a non permanent magnetic core.

9. The length measurement system according to claim 8, wherein a cross-section of the at least one measuring rod does not enclose the non permanent magnetic core.

10. The length measurement system according to one of claims 8 and 9, wherein the non permanent magnetic core is soft magnetic.

11. The length measurement system according to claim 8, wherein the non permanent magnetic core has a profile and is thus suitable to support the at least one measuring rod having a cross-section.

12. The length measurement system according to claim 1, wherein the at least one magnetic field sensor is a magnetoresistive angle sensor.

13. The length measurement system according to claim 12, wherein two identical magnetoresistive angle sensors are provided for one measuring rod precisely opposite one another at the cross-section in order to correct errors resulting from lateral displacement of the at least one measuring rod.

14. The length measurement system according to claim 7, wherein the circular measuring rod is magnetized in the form of a regular helix and a magnetoresistive angle sensor sends out periodic signals along a direction of measurement.

15. The length measurement system according to claim 14, wherein magnetization is only rotated by 180° over the entire length of the at least one measuring rod and an absolute position can thus be determined from a signal of the magnetoresistive angle sensor.

16. The length measurement system according to claim 7, wherein the circular measuring rod is magnetized from a starting end in a radial direction with a constantly decreasing period length and wherein the at least one magnetic field sensor is a pair of magnetoresistive angle sensors mounted at a spacing corresponding to a first period length at the starting end of the at least one measuring rod whereby the position can be determined from an angular difference between the pair of magnetoresistive angle sensors in order to eliminate errors through spontaneous rotation of the at least one measuring rod.

17. The length measurement system according to claim 16, wherein a spacing of the pair of magnetoresistive angle sensors at an end of the at least one measuring rod corresponds to two period lengths and the position can be determined absolute from an angular difference between the pair of magnetoresistive angle sensors.

18. The length measurement system according to claim 4, wherein each one value of a multi-valued code is assigned to prevailing directions of magnetization in the areas.

19. The length measurement system according to claim 18, wherein the multi-valued code is quadrivalent.

20. The length measurement system according to claim 18, wherein the multi-valued code is a decimal code.

21. The length measurement system according to claim 18, wherein a specific angular region of the direction of magnetization which corresponds to no code value is located in special regions which are situated at regular intervals and thus it is possible to detect a beginning of a word.

22. The length measurement system according to claim 21, wherein an angle of the direction of magnetization in the special region changes continuously with the position.

23. The length measurement system according to one of claims 18 to 22, wherein in order to detect the code there is double the number of settings of the code for magnetoresistive angle sensors whose spacing corresponds to half the length of the stepwise areas.

24. The length measurement system according to claim 1, wherein there are two parallel measuring rods of uniform length with different period length and a periodicity which is different by one, each with one magnetoresistive angle sensor located in the direction of measurement with the same value so that a position can be determined absolute from angles of the two magnetoresistive angle sensors.

25. The length measurement system according to claim 1, wherein at least one of the at least one measuring rod and the at least one associated sensor is in active connection with an adjustment mechanism of an adjusting device for a motor vehicle.

26. A seat adjustment device comprising:
   an adjustment mechanism;
   at least one magnetic measuring rod; and
   at least one magnetic field sensor which is displaceable relative to the at least one measuring rod in the direction of measurement,
   wherein magnetization of the at least one measuring rod has a component in a plane which is perpendicular to the direction of measurement,
   wherein the longitudinal position of the at least one magnetic field sensor relative to the at least one measuring rod can be determined from the direction of the component of magnetization,
   wherein the direction of the component of magnetization is rotated along the direction of measurement so that to each longitudinal position of the at least one magnetic field sensor is assigned a direction of the component of magnetization inside the at least one measuring rod at this longitudinal position from which the longitudinal position can be determined, and
   wherein at least one of the at least one measuring rod and the at least one associated sensor is in active connection with the adjustment mechanism.

27. The seat adjustment device according to claim 26, further comprising:
   a vehicle floor;
   a guide rail for horizontal seat adjustment coupled to the vehicle floor and connected to the at least one measuring rod; and
   a top rail coupled to the at least one sensor,
   wherein the at least one measuring rod extends substantially in the direction of displacement of the seat.

28. The seat adjustment device according to claim 26, further comprising a seat cushion support, wherein the at least one measuring rod is mounted on a part which is not vertically displaceable relative to the vehicle floor and extends substantially vertically and wherein the at least one associated sensor is fixed on the seat cushion support.

29. The seat adjustment device according to claim 26, further comprising a swivel mounted lever of at least one of a seat height and seat incline adjuster mounted to a part and fixed to the at least one measuring rod, the part coupled to the at least one sensor.

30. The seat adjustment device according to claim 29, wherein the at least one measuring rod is formed in a circular arc relative to the swivel axis of the lever.

31. The seat adjustment device according to claim 26, further comprising a rotatably mounted gear element of a device for adjusting the incline of the backrest, a gear housing surrounding the gear element and fixed to a part, the gear element coupled to the at least one measuring rod, and the at least one associated sensor coupled to the part.

32. The seat adjustment device according to claim 26, further comprising:
   a seat frame; and
   a backrest,
   wherein the at least one measuring rod is coupled to one of the backrest and seat frame, and the at least one associated sensor is coupled to the other of the backrest and seat frame.

33. The seat adjustment device according to claim 32, wherein the at least one measuring rod is formed in a circular arc relative to the swivel axis of the backrest.

34. The seat adjustment device according to claim 26, further comprising:
   a thigh support of a seat cushion depth adjuster, the thigh support connected to the at least one measuring rod; and
   a seat cushion support fixed to the at least one associated sensor.

35. The seat adjustment device according to claim 26, further comprising:
   a backrest support coupled to one of the at least one measuring rod and the at least one associated sensor; and
   a head restraint coupled to the other of the at least one measuring rod and the at least one associated sensor.

36. The seat adjustment device according to claim 35, further comprising a gearing movable along a gearing element which extends in a direction of adjustment, the gearing coupled to the at least one sensor.

37. The seat adjustment device according to claim 26, wherein the length measurement system is a constituent part of a device for at least one of detecting occupancy of the seat and for sensing the occupancy weight.

38. The seat adjustment device according to claim 37, further comprising:
   a cushion coupled to the at least one measuring rod; and
   a seat cushion support coupled to the at least one associated sensor.

39. The seat adjustment device according to claim 37, further comprising a guide sleeve fixed to the at least one associated sensor and in which the at least one measuring rod is mounted, wherein when the seat is occupied there is a displacement between the at least one measuring rod and the at least one sensor which is dependent on the weight of the load.

40. The length measurement system according to claim 25, wherein the at least one sensor is a direct constituent part of an electronic control device.

41. The length measurement system according to claim 25, further comprising an arm window lifter, wherein the length measurement system is a constituent part of the window lifter.

42. The length measurement system according to claim 41, further comprising:
   a segment lever of the arm window lifter having teeth, the teeth extending parallel to the at least one measuring rod; and
   a drive unit coupled to the at least one associated sensor.

43. The length measurement system according to claim 41, further comprising a door body coupled to the at least one associated sensor, wherein the at least one measuring rod extends sin a circular arc close to the swivel axis of the toothed segment lever and that the associated sensor is fixed on a part connected to the door body.

44. The length measurement system according to claim 41, further comprising:

a guide rail of the arm window lifter;

a slider guided in the guide rail displaceable to the at least one measuring rod; and a door body coupled to the at least one associated sensor.

45. The length measurement system according to claim 41, further comprising:

a window pane proximate to the arm window lifter;

a drive unit coupled to the at least one associated sensor; and gearing coupled to the drive unit, wherein the at least one measuring rod is displaceable in synchronization with the window pane by means of the gearing.

46. The length measurement system according to claim 41, comprising:

a window pane proximate to the arm window lifter;

a guide rail of the cable window lifter, located such that the at least one measuring rod extends along the guide rail; and a follower connected to the window pane and coupled to the at least one sensor.

47. The length measurement system according to claim 41, further comprising:

a cable drum connected to the at least one measuring rod; and a gear housing coupled to the at least one associated sensor, wherein the at least one measuring rod is formed circular.

48. The length measurement system according to claim 41, further comprising:

a housing connected to the at least one sensor; and a drive unit, wherein the at least one measuring rod is formed as a closed circumferential band, belt or similar which can be driven through a rotational axis of the drive unit.

49. The length measurement system according to claim 48, further comprising reduction gearing, wherein the circumferential measuring rod is coupled to the drive unit through the reduction gearing so that the at least one measuring rod revolves once when running through an adjustment path.

50. The length measurement system according to claim 41, further comprising:

a cable drum;

a cam associated with the at least one measuring rod which engages in a helical cable groove of the cable drum and displaces the at least one measuring rod when the cable drum rotates; and drive unit housing coupled to the at least one sensor.

51. The length measurement system according to claim 25, further comprising:

a window pane, having a substantially vertical edge on which the at least one measuring rod that is associated with the at least one sensor is mounted; and a door body within which the at least one sensor is situated.

52. The length measurement system according to claim 25, further comprising a vehicle door lock, wherein the at least one measuring rod is mounted in the vehicle door lock in order to detect the closed position.

53. The length measurement system according to claim 1, further comprising a wireless signal transmission device connected to the at least one sensor for sending the measurement signals to an electronic control device.

* * * * *

UNITED STATES PATENT AND TRADEMARK OFFICE
CERTIFICATE OF CORRECTION

PATENT NO.    : 6,545,463 B1
DATED         : April 8, 2003
INVENTOR(S)   : Dettmann et al.

It is certified that error appears in the above-identified patent and that said Letters Patent is hereby corrected as shown below:

Column 18,
Line 63, replace "extends sin" with -- extends in --.

Signed and Sealed this

Twenty-ninth Day of November, 2005

JON W. DUDAS
*Director of the United States Patent and Trademark Office*